United States Patent [19]

Grimminger et al.

[11] Patent Number: 5,029,403

[45] Date of Patent: Jul. 9, 1991

[54] POST TREATMENT PLANT FOR PLASTIC GRANULES

[75] Inventors: Albert Grimminger, Leonberg; Franz J. Muller, Bietigheim-Bissingen; Edgar Schlipf, Stuttgart, all of Fed. Rep. of Germany

[73] Assignee: Werner & Pfleiderer GmbH, Stuttgart, Fed. Rep. of Germany

[21] Appl. No.: 524,145

[22] Filed: May 15, 1990

[30] Foreign Application Priority Data

Jul. 1, 1989 [DE] Fed. Rep. of Germany ....... 3921685

[51] Int. Cl.$^5$ .............................................. F26B 5/14
[52] U.S. Cl. .......................................... 34/14; 34/60; 34/69; 210/771
[58] Field of Search ...................... 34/14, 69, 192, 182, 34/183, 172, 60, 58, 61, 237; 210/771, 770

[56] References Cited

U.S. PATENT DOCUMENTS

| | | | |
|---|---|---|---|
| 3,199,215 | 8/1965 | Jesse et al. | 34/69 |
| 4,310,973 | 1/1982 | King | 34/61 |
| 4,319,409 | 3/1982 | Scholz et al. | 34/60 |

FOREIGN PATENT DOCUMENTS 1276324 8/1968 Fed. Rep. of Germany .
2850584 6/1980 Fed. Rep. of Germany .

*Primary Examiner*—James C. Yeung
*Attorney, Agent, or Firm*—Ladas & Parry

[57] ABSTRACT

A compact plant for the post-treatment of wet plastic granules in which a rotatable or longitudinally displaceable conveyor-separator is movable between positions in which the wet granules are selectively dewatered or diverted from flowing to a dryer. A water tank is located below the conveyor-separator for receiving water or wet granules therefrom. Water separated in the dryer is also supplied to the water tank. A replaceable screen cassette is supported in the water tank.

20 Claims, 4 Drawing Sheets

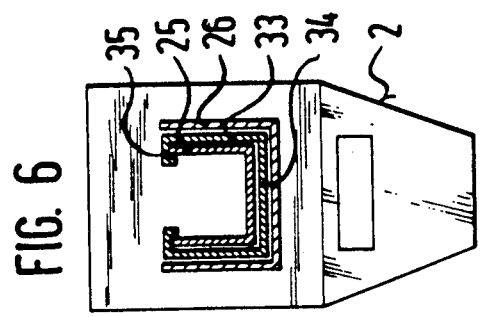
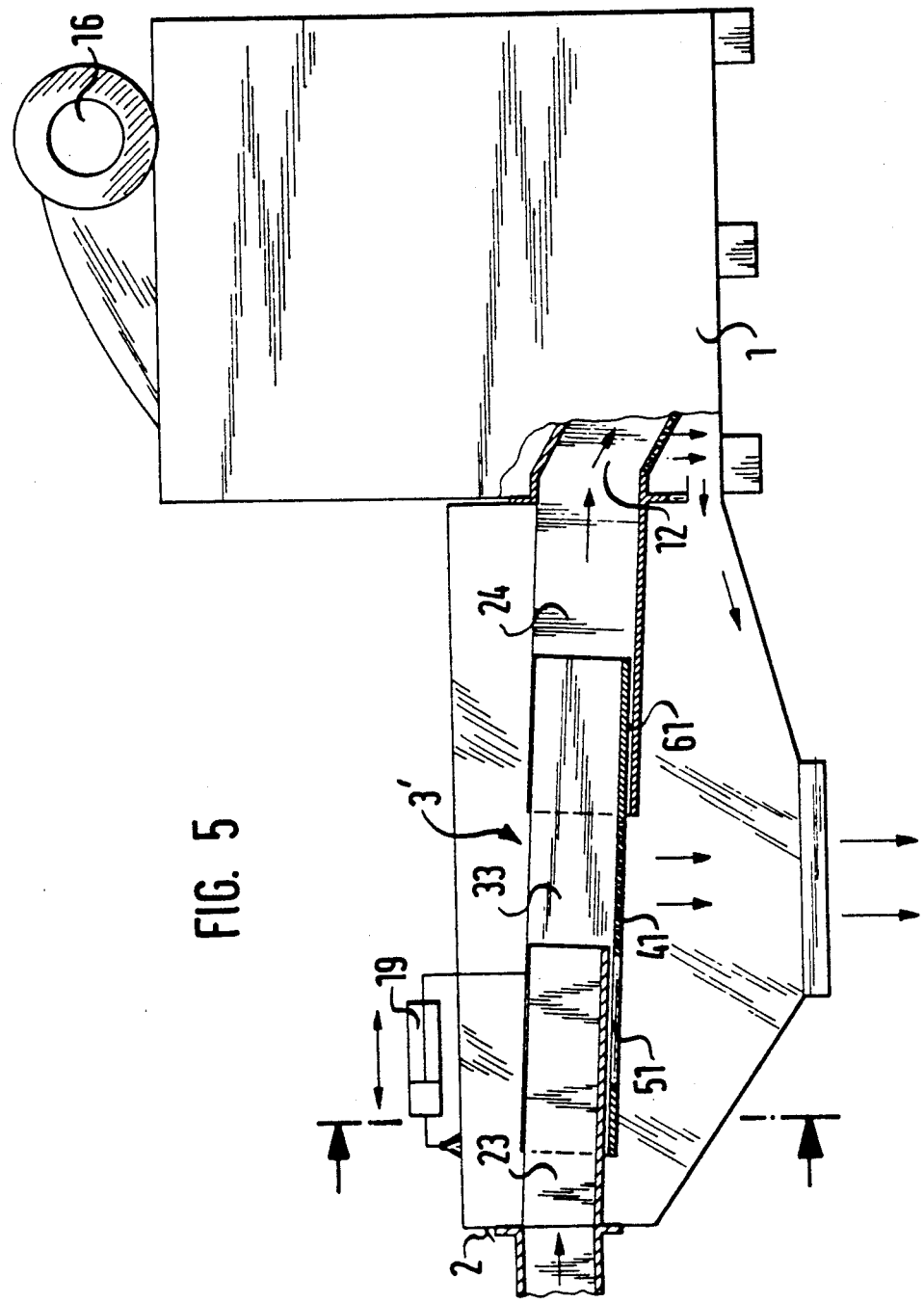

POST TREATMENT PLANT FOR PLASTIC GRANULES

FIELD OF THE INVENTION

The invention relates to a post-treatment plant for plastic granules in which a mixture of water and granules is received from a granulating means and the water is separated and the granules are dried.

More particularly, the invention is concerned with the construction of an intermediate means between the granulating means and a dryer, and especially with a conveyor-separator of the intermediate means.

DESCRIPTION OF THE PRIOR ART

Underwater granulation or water-cooled granulation is widely employed in the mass production of plastics. During startup and shutdown and when there are disturbances in the supply means for introducing the raw material, faulty granules may be formed. If these succeed in reaching storage containers beyond the dryer, small quantities of faulty granules can cause large quantities of acceptable granules to become worthless. Hence, it is known to provide a shunt or by pass after the granulation device in the post-treatment path of the granules in order to divert the faulty granules from the main stream.

Such a shunt is described in DE-AS 12 76 324 which consists of a branch with a control valve in a cold water line between a granulating head and a water separator. The valve closes the line to the water separator and opens a branch line for bypass of faulty granules during startup and shutdown of the plant and in the case of operational disturbances.

The branch line may include a T or Y-shaped tube segment containing the valve. The branch line leads to a second water separator, whose water outlet line is joined to the cold water circulating line. A disadvantage of this arrangement is that a great amount of space is required for the individual units for post-treatment of the granules.

Further, DE-OS No. 28 50 584 discloses a screen for effecting a preliminary dewatering at the inlet of a separating and drying chamber. A disadvantage of this arrangement is that the preliminary dewatering cannot be controlled. In addition, in this device, a shunt is generally not provided.

SUMMARY OF THE INVENTION

An object of the invention is to reduce plant expenditure for the post-treatment of wet plastic granules and to improve the cooling and drying discharge of the granules.

The above and further objects of the invention are satisfied by a post-treatment plant, connected to a granulating means supplying a mixture of water and granules, comprising drying means for drying the granules, and intermediate means between said granulating means and said drying means for selectively transporting or diverting the mixture of water and granules from said granulating means to said drying means. The intermediate means comprises conveyor-separator means for said mixture, said conveyor-separator means being movable to provide first and second positions in which in said first position said mixture undergoes dewatering so that dewatered granules are supplied to said dryer means and in said second position the mixture is diverted from the flowing to said dryer means. A water tank is positioned beneath said conveyor-separator means for receiving water from the conveyor-separator means in said first position and diverted mixture from the conveyor-separator means in said second position. A replaceable screen is supported in said water tank.

In accordance with the invention, the conveyor-separator means serves as a combination of a shunt or bypass and a preliminary dewatering means assembled as a common unit before the inlet to the dryer means.

By making the conveyor-separator means as a common structure at the inlet of the dryer means, a substantial reduction in length of the post-treatment path of the granules is obtained, and further savings of structural parts are obtained due to the common discharge of the entire plant into only one water tank through the replaceable screen which can be in the form of a replaceable cassette.

The changeover from discharge of faulty granules to the preliminary dewatering of the granule-water mixture is effected by turning a rotatable tube according to one embodiment of the conveyor-separator means. The tube is provided with a wall having three segments, namely a perforated wall segment, a completely open segment, and a solid wall segment. The perforated wall segment extends over an angle up to 180° and the open segment extends over an angle up to 60°. Thereby, the preliminary dewatering of the granule-water mixture is possible from 0 to nearly 100%. In this way, there is an optimal adaptation of the preliminary dewatering process to different operational conditions and/or different granule properties.

In an advantageous construction, the dryer has a dewatering outlet which is connected to the water tank. Thereby the residual water of the granules, which is separated in the dryer, is also discharged into the water tank of the preliminary dewatering unit.

In another advantageous construction, the dryer means and said intermediate means are supported by a frame on rollers and the inlet of the conveyor-separator means is connected to the granulating means by a coil of flexible tubing. In this way, an arbitrary positioning of the granule post-treatment plant with respect to the granulating means can be effected while the length of the cold-water path defined by the flexible tubing can be adapted to different plastic granule products.

According to another embodiment of the invention, the movable conveyor-separator means comprises a displaceable U-shaped channel member having a bottom including in succession, an open segment, a perforated segment and a solid segment. The channel member is displaceable longitudinally to position the segments operatively above the water tank. This embodiment of the post-treatment plant permits its use for large throughput quantities without higher expenditures.

The displaceable channel member is slidably supported at its ends by fixed channel members and preferably the displaceable channel member is suspended from one of the fixed channel members to minimize blockage by plastic granules or impurities.

Advantageously, the displaceable channel member is driven by a hydraulic cylinder which is effective for large plants.

BRIEF DESCRIPTION OF THE FIGURES OF THE DRAWING

The invention is described in greater detail hereafter with reference to the embodiments shown in the drawing, wherein:

FIG. 5 is a view similar to FIG. 1 of another embodiment of the post-treatment plant having displaceable channel members in a preliminary dewatering position;

FIG. 6 is a section taken on line 6—6 in FIG. 5; and

DETAILED DESCRIPTION OF PREFERRED EMBODIMENTS

Figure 1:
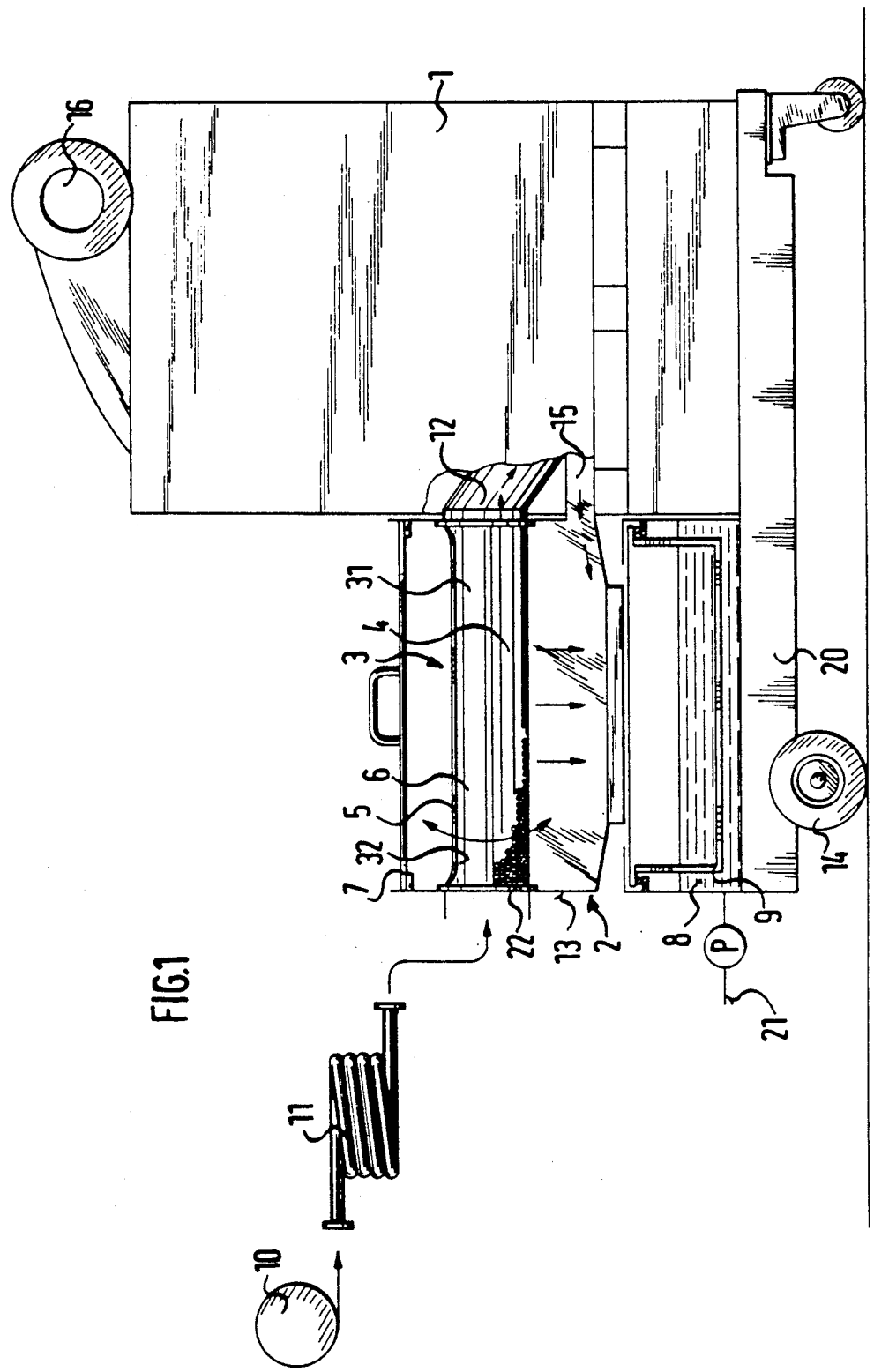
FIG. 1 diagrammatically illustrates in side elevation and partly broken away a post-treatment plant for granules having a rotatable tube construction.

FIG. 1 shows a post-treatment plant for granules comprising a dryer 1, an inlet container 2 including a conveyor-separator means 3 comprising a rotatable tube 31, and a water tank 8 provided with replaceable screen cassettes 9, the plant being arranged on a frame 20 supported on rollers 14. The inlet container 2 is connected to a granulating device 10 by a coiled, transparent and flexible tubing 11. The inlet container 2, including the conveyor-separator means 3 therein, serves as an intermediate means between the granulating device 10 and the dryer 1 for selectively transporting or diverting the mixture of water and granules from the granulating device 10 to the dryer 3. The water tank 8 is provided with a cold water return 21 connected to granulating device 10. The dryer 1 has a dewatering outlet 15 connected to water tank 8 and a discharge outlet 16 for dried granules. The rotatable tube 31 has a wall with three successive angular segments consisting respectively of a perforated wall segment 4, an open wall segment formed by a slot 5 and a solid wall segment 6. The tube 31 is turnable to provide positions for partial dewatering of the mixture, full dewatering of the mixture and complete diversion or shunting of the mixture to the water tank 8.

Figure 2:
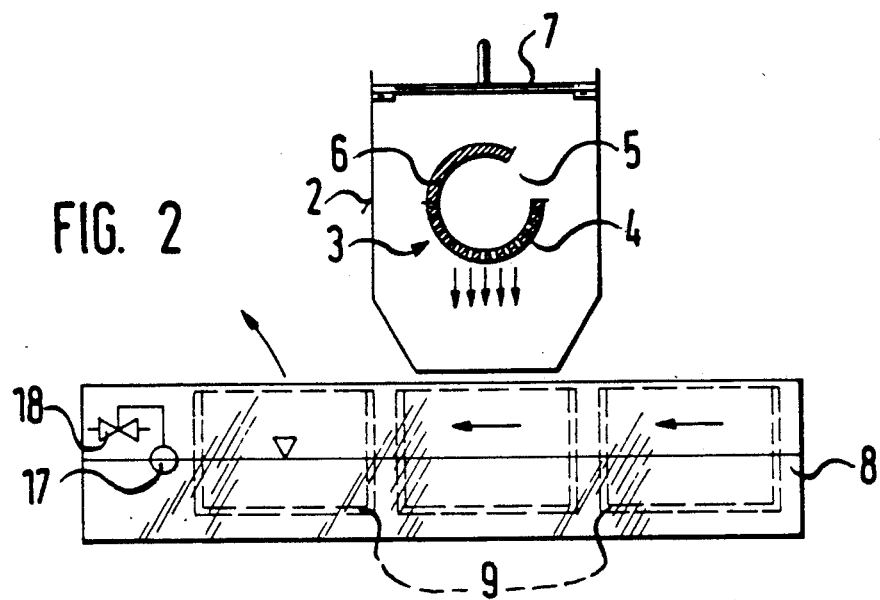
FIG. 2 is a front view of the rotatable tube in FIG. 1 with an inlet container and a water tank, in a preliminary dewatering position.
Figure 3:
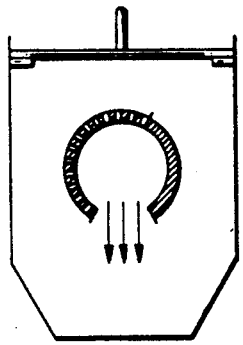
FIG. 3 shows the rotatable tube in FIG. 2 in a startup position.
Figure 4:
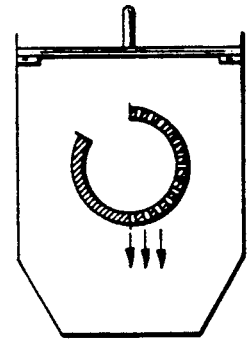
FIG. 4 shows the rotating tube in FIG. 2 during a partial preliminary dewatering operation.

The inlet container 2 is provided with a removable cover 7 on its top. In this way a visual examination and adjustment of the rotatable tube 31 can be made. The tube 31 is supported by a bearing 22 at the front end 13 of inlet container 2. The angular positions of the rotatable tube 31 for preliminary dewatering, discharge of faulty granules and partial preliminary dewatering are respectively shown in FIGS. 2-4. Discharge is always effected into water tank 8, the water level of which is adjustable by means of a float 17 and a valve 18. The screen cassette 9 is constructed as a particle filter and a collector for faulty granules and cassette 9 is arranged in a removable manner in water tank 8 as a through-screen cassette.

Figure 7:
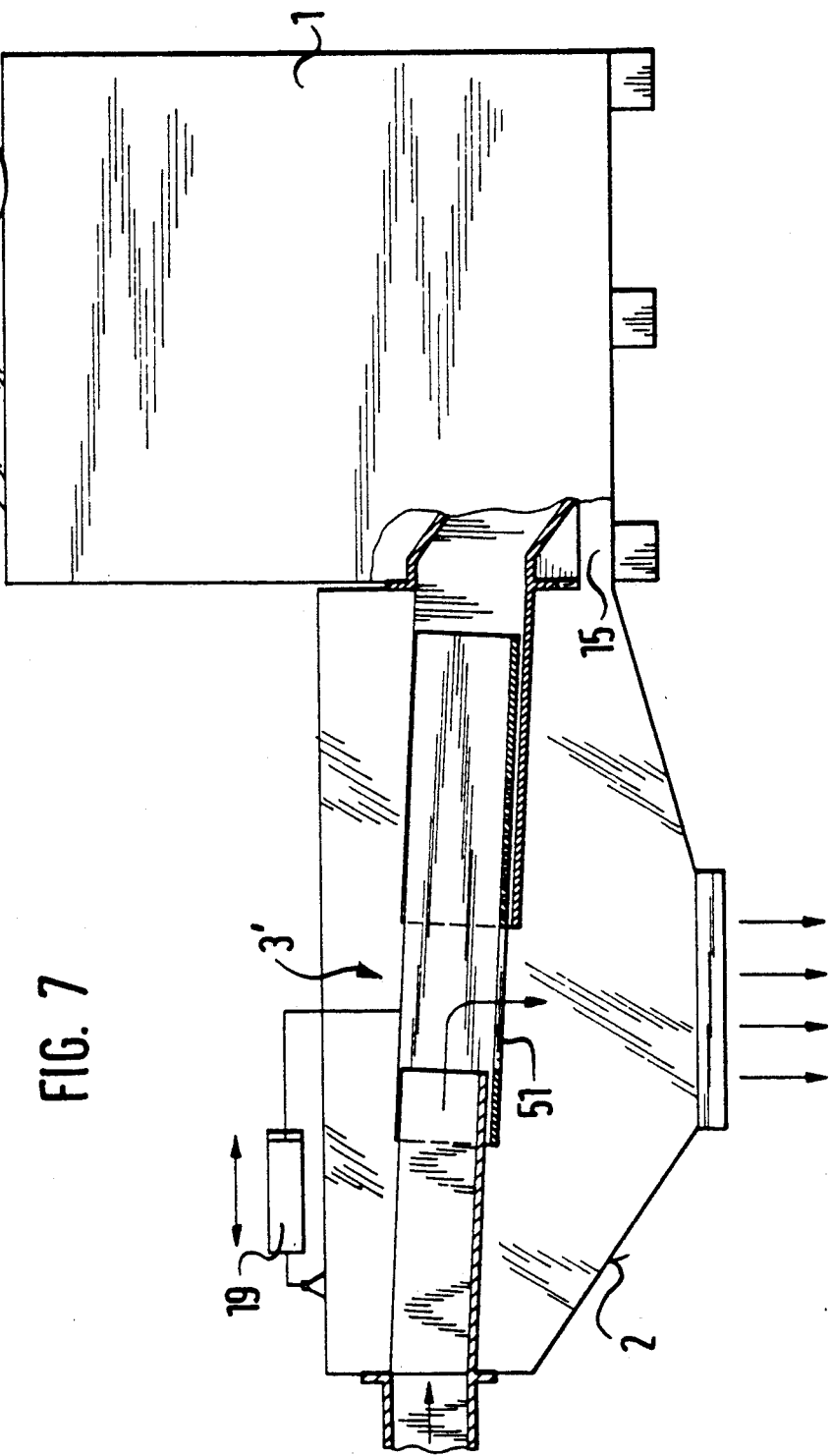
FIG. 7 shows the embodiment of FIG. 5 in which the channel members are in position for discharge of defective granules.

For post-treatment plants with large throughput capacities, it is advantageous to construct the conveyor-separator as shown at 3' in FIGS. 5-7 as a U-shaped channel member 33. A bottom 34 of channel member 33 is constructed in the longitudinal direction successively as an open slot segment 51, a perforated segment 41, and a solid segment 61. U-shaped inlet and outlet channel members 23 and 24 are rigidly mounted in inlet container 2 for slidably supporting the channel member 33.

In order to avoid distrubances in transport, the inlet channel member 23 is smaller and the outlet channel member 24 is larger than the moveable channel member 33. Channel member 33 is suspended in a displaceable manner by means of hook-shaped reinforcements 35 on side walls 25 of inlet channel member 23. A hydraulic cylinder 19 is arranged on inlet container 2 for the displacement of channel member 33.

Channel member 33 may be of other than U-shape in which case inlet and outlet channels 23 and 24 will be correspondingly shaped so that the channel member is displaceable therein.

The mode of operation of the plant is as follows:

The granule-water mixture transported from granulating device 10 reaches inlet container 2 of dryer 1 by means of the flexible tubing 11 serving as a cooling path for the mixture.

During startup, slot 5 of rotatable tube 31 is positioned to face downwards towards water tank 8 (FIG. 3), so that the incoming faulty granule-water mixture is discharged in entirety into screen cassette 9 of water tank 8. When a uniform granule-water mixture is transported through tubing 11, the perforated segment 4 of rotatable tube 31 is positioned downward (FIG. 3) or partially downward (FIG. 4), and thus a complete or partial preliminary dewatering of the granules is obtained prior to entry of the granules into dryer 1. The adjustment of preliminary dewatering is possible from 0 to nearly 100%, and is regulated as a function of the properties of the granules that are post-treated. In this respect the perforated segment 4 extends over an angle of about 180°, the solid segment 6 over an angle of about 120° and the slot 5 over an angle of about 60°. Segment 4 and slot 5 can extend over smaller angular extends depending on the material being conveyed.

The granules are dried to the desired degree of drying in dryer 1 and the dried granules are discharged via discharge connection 16 of dryer 1. In this way, the water separated from the granules in dryer 1 and the particles contained therein reach water tank 8 via the dewatering outlet 15. The particles are collected in screen cassette 9 before the water is again supplied to granulating device 10 as cooling water. When the screen cassette 9 is contaminated with particles and/or faulty granules, it is replaced by a new cassette. The cassette can be cleaned after its removal from the water tank 8. By virtue of the processing capacity of the post-treatment plant of the invention it can be located at any position and distance from the granulating device 10. By means of the coiled flexible tubing 11, the cold water path can be precisely adapted to the respective type of granules.

The mode of operation of the displaceable channel member 33 is analogous to that of rotatable tube 31 described previously, except that instead of rotation, a longitudinal displacement of channel 33 is employed for the individual discharge conditions of the granule-water mixture. A space-saving construction over the prior art technology for post-treatment of plastic granules is obtained by both embodiments i.e., the rotatable tube 31 or channel member 33, due to the compact structure and combination of operations including shunting, and preliminary dewatering of granules as well as the common discharge, including the dryer, by means of a screen cassette in a single water tank.

In addition, the degree of preliminary dewatering can be adjusted in steps depending on the proportion of the perforated wall segment and the solid wall segment facing the water tank.

Although the invention has been disclosed with reference to preferred embodiments thereof, it will become apparent to those skilled in the art that numerous modifications and variations can be made within the scope and spirit of the invention as defined in the attached claims.

What is claimed is:

1. A post-treatment plant for granules supplied by a granulating means in the form of a mixture of water and granules, said post-treatment plant comprising drying means for drying the granules, and intermediate means between the granulating means and said drying means for seletively transporting or diverting the mixture of water and granules from said granulating means to said drying means, said intermediate means comprising conveyor-separator means for said mixture, said conveyor-separator means being movable to provide first and second positions in which in said first position said mixture undergoes dewatering by said conveyor-separator means so that dewatered granules are supplied to said dryer means and in said second position the mixture is diverted from flowing to said dryer means, a water tank beneath said conveyor-separator means for receiving water from the conveyor-separator means in said first position and diverted mixture from the conveyor-separator means in said second position, and replaceable screen means in said water tank.

2. A post-treatment plant as claimed in claim 1, wherein said replaceable screen means comprises a replaceable screen cassette.

3. A post-treatment plant as claimed in claim 2, wherein said intermediate means comprises an inlet container for said conveyor-separator means.

4. A post-treatment plant as claimed in claim 3, wherein said conveyor-separator means comprises a rotatable tube including a wall with three segments, one of which is a perforated wall segment, a second of which is a completely open segment and a third of which is a solid wall segment.

5. A post-treatment plant as claimed in claim 4, wherein said inlet container includes a first wall on which said tube is rotatably supported.

6. A port-treatment plant as claimed in claim 4, wherein in said second position said open segment of the wall of the rotatable tube faces downwardly towards said tank, whereas in said first position at least a portion of said perforated wall segment of said rotatable tube faces downwardly towards said tank.

7. A post-treatment plant as claimed in claim 4, wherein the perforated wall segment extends over an angle of up to 180° of the rotatable tube and said open segment extends over an angle of up to 60° of the rotatable tube.

8. A post-treatment plant as claimed in claim 3, wherein said dryer means includes a dewatering outlet which is connected to said water tank.

9. A post-treatment plant as claimed in claim 3, comprising frame means including rollers supporting said drying means and said intermediate means, and a flexible, coiled tubing connecting said granulating means and said intermediate means.

10. A post-treatment plant as claimed in claim 3, comprising a removable top for said intermediate means above said conveyor-separator means.

11. A post-treatment plant as claimed in claim 3, wherein said conveyor-separator means comprises a displaceable channel member having a bottom facing said water tank and including an open segment, a perforated segment and a solid segment.

12. A post-treatment plant as claimed in claim 11, comprising fixed channel members on said inlet container displaceably supporting said displaceable channel member such that a selective portion of said bottom faces said water tank.

13. A post-treatment plant as claimed in claim 12, wherein said displaceable channel member has front and rear ends of said fixed channel members being at said front end of the displaceable channel member for receiving the mixture from the granulating means, another of said fixed channel members being at said rear end of the displaceable channel member for conveying dewatered mixture to said dryer means, said displaceable member extending between said fixed channel members with said bottom facing said water tank.

14. A post-treatment plant as claimed in claim 13, wherein said displaceable channel member is fitted within a first of said fixed channel members, a second of said fixed channel members being fitted within said displaceable channel member.

15. A post-treatment plant as claimed in claim 14, wherein all said channel members are U-shaped.

16. A post-treatment plant as claimed in claim 14, wherein said displaceable channel member is suspended from one of said fixed channel members by hook-shaped reinforcement means.

17. A post-treatment plant as claimed in claim 16, comprising a hydraulic cylinder drivingly connected to said displaceable channel member to move the same.

18. A method for the post treatment of granules comprising
supplying a mixture of water and granules to a conveyor-separator,
selectively conveying the mixture to a dryer or diverting the mixture into a water tank,
when conveying the mixture to the dryer by the conveyor-separator selectively effecting dewatering of the mixture so that a dewatered mixture is supplied to the dryer, the water separated by the conveyor-separator being deposited into said water tank, and
screening the mixture which is introduced into said water tank.

19. A method as claimed in claim 18, comprising supplying to said water tank water separated from the granules which are dried in the dryer.

20. A method as claimed in Claim 18, comprising providing three positions for said conveyor-separator in which the conveyor-separator respectively partially dewaters the mixture before transporting the same to the dryer, maximally dewaters the mixture before transporting the same to the dryer and diverts the mixture so that the same is not transported to the dryer.

* * * * *